United States Patent [19]

Parker

[11] Patent Number: 4,513,548
[45] Date of Patent: Apr. 30, 1985

[54] INSULATED WINDOW COVER APPARATUS

[76] Inventor: Gregory H. Parker, 6450 N. 78th St., #242, Scottsdale, Ariz. 85253

[21] Appl. No.: 488,261

[22] Filed: Apr. 25, 1983

[51] Int. Cl.³ .............................................. E06B 3/26
[52] U.S. Cl. ........................................ 52/202; 49/61; 296/211; 296/218
[58] Field of Search ..................... 52/202; 49/61, 62; 296/218, 211, 216, 222

[56] References Cited

U.S. PATENT DOCUMENTS

| | | | |
|---|---|---|---|
| 2,041,281 | 5/1936 | Bishop | 296/216 |
| 4,161,336 | 7/1979 | LeVan et al. | 296/218 |
| 4,272,934 | 6/1981 | Cowder et al. | 52/202 |
| 4,290,640 | 9/1981 | Dalton | 296/216 X |
| 4,337,975 | 7/1982 | Tamamushi et al. | 296/218 X |
| 4,416,096 | 11/1983 | Schuster et al. | 52/202 |
| 4,420,184 | 12/1983 | Kaltz | 296/222 X |

Primary Examiner—Carl D. Friedman
Attorney, Agent, or Firm—Weiss & Holloway

[57] ABSTRACT

An insulated window insert or cover apparatus for use in motor vehicles having at least one window in the top or roof thereof which can be removed, tilted open, repositioned and the like to let in air. The insert apparatus includes a generally rectangular sheet of support material for blocking out the light from the sun which enters the roof window and insulation for absorbing the heat which enters the window to prevent the motor vehicle interior from becoming too hot and rendering the air conditioner inefficient and costly to run. The sheet and insulation are covered with a material whose interior-facing portion substantially matches the color, texture and fabric thereof for esthetic purposes. In particular cases, a resilient sheet of material may be used and the sheet may be eliminated and a relatively rigid sheet of plastic-foam material substituted in its place to serve a dual function. Insulation may be placed above or below the sheet or both and a fastener can be provided on the cover for removing the cover for cleaning purposes or for adding or removing insulation, as desired. Another embodiment, includes placing fastening means on the ceiling of the car and on the top of the window insert apparatus and removeably securing the apparatus from the inside of the car without leaving the vehicle, opening the window or the like.

30 Claims, 16 Drawing Figures

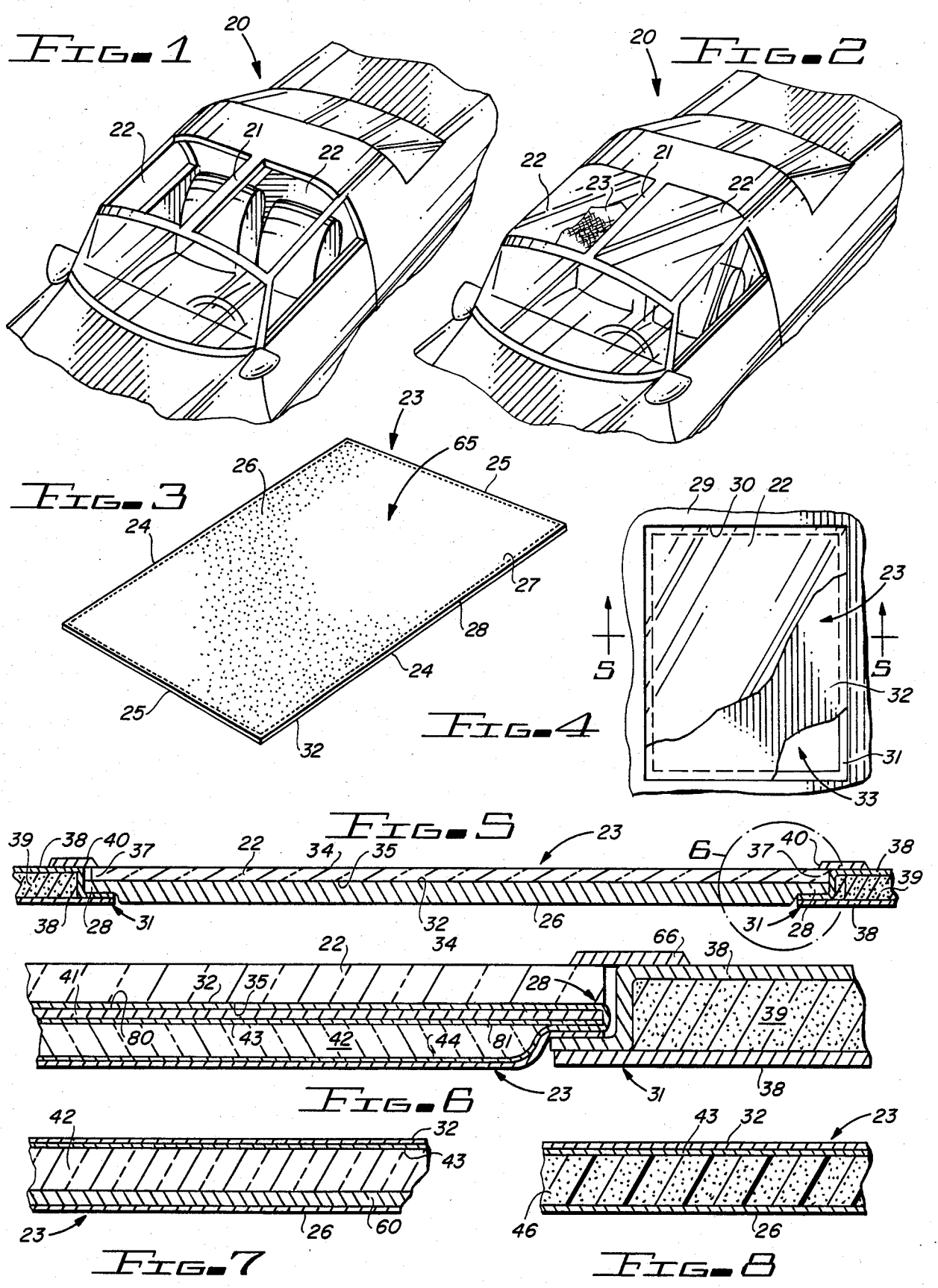

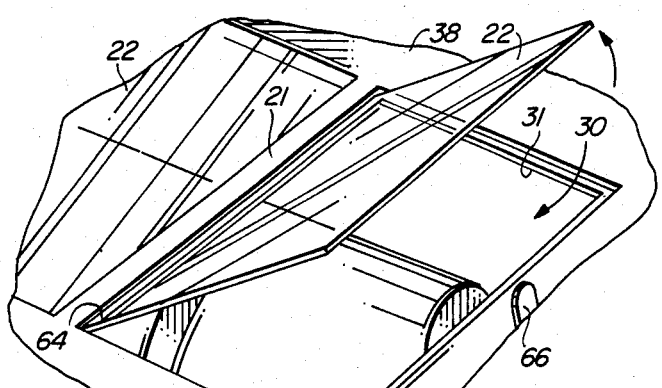
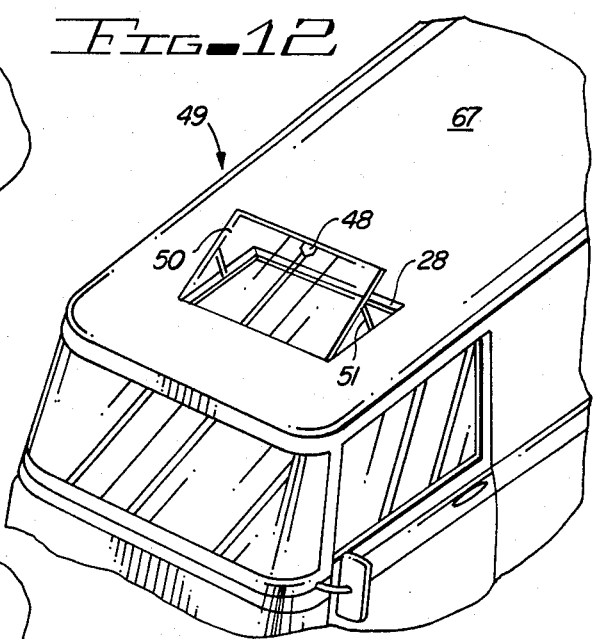
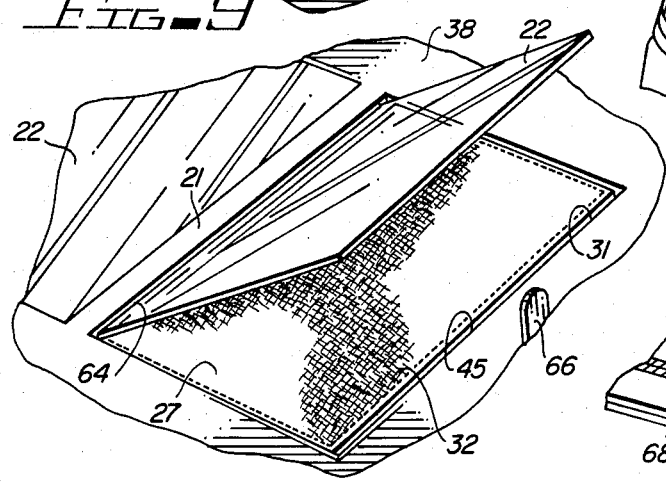
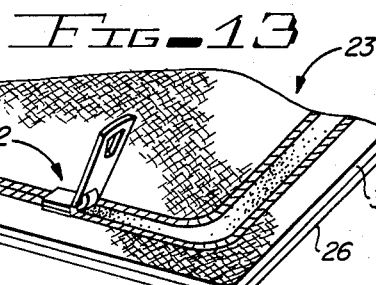
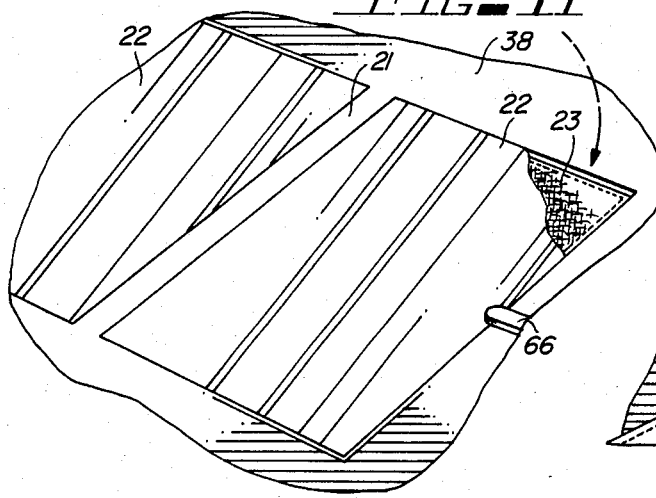
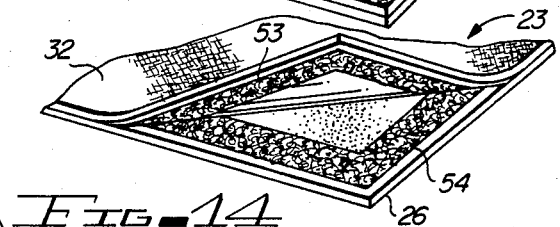
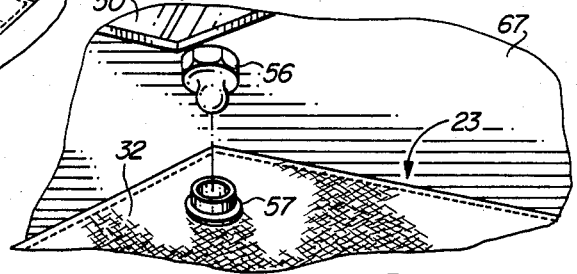
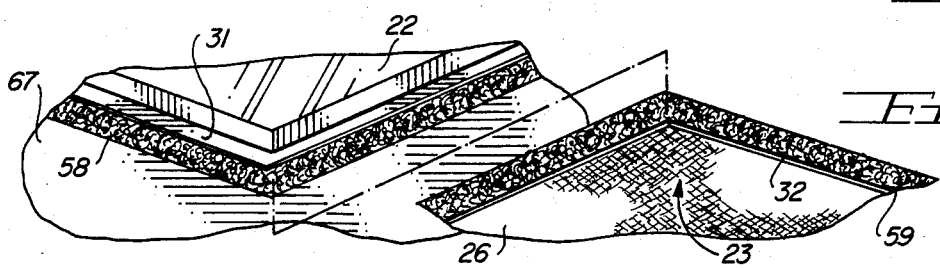

INSULATED WINDOW COVER APPARATUS

BACKGROUND OF THE INVENTION

1. Field of the Invention

This invention relates generally to a window cover apparatus for the top window in a motor vehicle and more particularly to a relatively thin pillow-like insulated window insert adapted to be removably inserted in the top window opening of a motor vehicle and clampably retained therein by closing and locking the top window thereon.

2. Description of the Prior Art

Until the last decade, there were substantially no glass windows in the tops or roofs of automobiles, trucks, vans, buses and other motor vehicles, and therefore no problem with sunlight and heat entering the vehicle interior through the top window to render the interior or cabin uncomfortable, to cause a substantial decrease in the efficiency of the air conditioner, and a corresponding increase in the cost of fuel to operate the motor vehicle.

Once the top or roof windows were introduced, such as the T-top pair of top windows of the preferred embodiment of the present invention, and other top windows such as moon roofs, sun roofs, and the like, sunlight and heat became a major problem. When the windows are opened to admit air to the interior of the motor vehicle, there are no substantial problems, but when the windows are closed and locked, the sunlight impinging on the top window enters the interior of the motor vehicle and is often reflected off of internal surfaces to partially blind the operator of the vehicle. Furthermore, the heat entering the top glass window into the interior of the vehicle renders the interior or cabin somewhat uncomfortable, often to the point of causing a burning sensations about the operator's head, neck, shoulders, arms and the like or even causing lightheadedness or sunstroke.

If an air conditioner is used to combat this problem, the incoming heat will rapidly warm the cool air conditioned air making it uncomfortable and thereby lowering the efficiency of the air conditioner or requiring too great an increase in fuel consumption to warrant eliminating the problem in this manner. Besides, this does nothing about the sunlight and glare problem.

Another solution suggested in the prior art was the use of tinted glass for the top windows. However, this distracts from a major use or purpose of the top windows. If the occupants of the cabin want to look out at the sky, clouds, stars, and the like, they have only a restricted or limited view through the tinted top windows under non-sunny conditions. Besides, tinted glass does not effectively stop a substantial percentage of the incident sunlight during sunny conditions and there is little or no heat absorption so that substantially all of the solar heat passes through the top glass window and enters the interior of the motor vehicle to cause the problems itemized above.

Other attempts to provide a window blind shade or a sliding piece of painted cardboard which can be pulled out of a slot in the roof or ceiling materials to a position under the top window to block out some desired portion of sunlight, offer a partial, but totally inadequate solution to the present problems. These methods produce only some degree of shade within the interior of the vehicle, only slightly more than that provided by the tinted glass windows discussed above, and they leave the major problem—the entry of solar heat into the vehicle interior, unaddressed.

Yet further, the use of such devices is unsightly, often requires modification to the vehicle interior, and generally produces a cheap look to top windows which were added at great expense to the owner of the motor vehicle. The pillow-like insulating window insert apparatus of the present invention solves substantially all of the problems and provides a relatively low cost, extremely simple means whereby a window insert apparatus can be removably positioned and clamped immediately below the top window of a motor vehicle so as to block or reflect substantially all incident sunlight, to absorb incoming heat while preventing escape of the cool air conditioned air from the interior, and while presenting only interior material which matches the fabric, color and texture of the interior of the vehicle for esthetic purposes.

SUMMARY OF THE INVENTION

The present invention provides an insulated window insert apparatus for use in motor vehicles having at least one top window. It is contemplated that the top window is adapted to be removed, tilted open, re-positioned and the like to let air in and that the window rests upon a window frame ledge and flange extending inwardly toward the window opening from the window frame.

The insulated window insert apparatus includes a generally rectangular sheet of support material for blocking out sunlight and insulation disposed proximate at least one surface, preferably the lower surface, of the sheet of support material. A cover is provided for containing both the sheet of support material and the insulation and the cover is fastened around the peripheral edge of the sheet of support material for forming a cushioning lip for resting between the flange and the glass window when the window is closed and locked to clamp the insert in place.

The preferred embodiment of the present invention contemplates the sheet of support material as including a sheet of relatively rigid material such as wood, plastic, metal, cardboard, pressed paper and the like although a sheet of resilient material capable of flexing for insertion into the window ledge or slot prior to closing the window thereon for clamping purposes may also be used. The sheet of support material may include a reflective top surface for reflecting incoming heat and light and the insulation may include conventional fiberglass having outer layers of reflective foil.

Furthermore, alternate embodiments of the insulation means contemplate the insulation as being at least one sheet of insulation material while another embodiment contemplates a relatively loose fill type or bulk material. Yet further, the insulation may include a plurality of removeably stacked sheets of insulation material such as fiberglass, foam, fiber, plastic, foam rubber and the like. And lastly, the sheet support means may be eliminated and a relatively stiff or rigid piece of polyurethane foam insulation can be used to serve both purposes.

The alternate embodiments also contemplate the insulation disposed beneath the sheet of support material, on top of the sheet of support material, or on both sides of the sheet, as desired to meet the needs to a particular situation. The cover includes a top surface and a bottom surface and means for fastening the two surfaces together about their peripheries for securing the sheet means and insulation therein to form a relatively thin pillow-like structure. One of the covers, preferably the upper cover facing the window may include fastening means such as velcro strips, snaps, a zipper or the like for selectively opening the cover for removing the cover from the support sheet and insulation for cleaning purposes and the like and for selectively adding and removing sheets or quantities of bulk insulating material to increase and decrease the insulation characteristics of the system depending upon the degree of the heat problem at a particular time.

In yet another alternate embodiment, the interior ceiling or roof of the car is provided with a velcro strip or pads about the periphery of the window opening and the strip is preferably built into the interior fabric or suitably matched for esthetic purposes while a second velcro strip is secured above the periphery of the upper window-facing sheet of the window insert apparatus to enable simply picking up the apparatus and pressing the velcro strips together to almost instantaneously block out sunlight, provide heat absorption, increase the air conditioner efficiency, and not significantly detract from the esthetics of the vehicle interior.

While any type of fastening means may be used, a set of male and female snap fasteners could be aligned about the periphery of the window opening and the periphery of the upper surface of the insert apparatus for quick fastening and removal over the window opening as, could twist fasteners, and any similar fastening device known in the art.

Other advantages and meritorious features of the present invention will be more fully understood from the following description of the drawings and the preferred embodiment, the appended claims, and the drawings which are defined hereinbelow.

BRIEF DESCRIPTION OF THE DRAWINGS

FIG. 1 is a partial perspective view of a T-top automobile having a pair of top windows;

FIG. 2 is a partial perspective view of a T-top automobile having a pair of top windows including at least one window with the insulating insert apparatus of the present invention operatively disposed therein;

FIG. 3 is a perspective view of the insulated window insert apparatus or window cover of the present invention;

FIG. 4 is a top view of the left top window of the automobile of FIG. 2 partially broken away to show the various layers thereof;

FIG. 5 is a sectional view taken along lines 5—5 of FIG. 4;

FIG. 6 is a detailed view of that portion of FIG. 5 within the dashed circle labeled with reference numeral "6";

FIG. 7 is a cut-a-way partial side view of an alternate embodiment of the insulated window insertion apparatus of FIG. 3;

FIG. 8 is a partial side view of an alternate embodiment of the insulated window insertion apparatus of FIG. 3;

FIG. 9 is a partial perspective view showing a top window of the vehicle of FIG. 1 in the open position;

FIG. 10 is a partial perspective view of the open window of FIG. 9 with the insulated insert apparatus of the present invention positioned therein;

FIG. 11 is a partial perspective view of the window and insert apparatus of FIG. 10 with the window closed and locked;

FIG. 12 is a partial perspective view of a van having a tiltable sun roof;

FIG. 13 is a detailed view of an alternate embodiment of the cover of FIG. 3 including a zipper;

FIG. 14 is a partial perspective view of an alternate embodiment to the cover of FIG. 3 using velcro strips to open and close the cover;

FIG. 15 is an alternate embodiment of the clamping apparatus wherein male snaps are disposed about the periphery of the inside window opening and female snap members are positioned above the periphery of the top of the insulated insert apparatus or vice versa for quickly attaching and removing the insert apparatus from inside the vehicle without unlocking or opening the top window; and FIG. 16 shows a partial perspective broken away view illustrating another alternate embodiment wherein the insert apparatus is removeably secured about the inside of the window opening by velcro strips set in the roof or ceiling of the vehicle interior.

DESCRIPTION OF THE PREFERRED EMBODIMENT

FIG. 1 shows a relatively expensive T-top automobile 20 including a centrally disposed T-bar 21 and a pair of generally rectangular top T-bar glass windows. The glass windows are clampably attached or secured within window openings, as hereinafter described, so as to seal the interior of the motor vehicle 20 during normal conditions. However, the top windows 22 can be tilted up or removed while other types top windows can slide back into the roof or be re-positioned to permit air into the interior of the automobile 20, if desired.

FIG. 2 shows the automobile 20, the T-bar 21 and the pair of top T-bar windows 23 with a portion of the T-bar window on the passenger side cut away to show the insulated insert apparatus or window cover 23 of the present invention removeably secured in its position under the window 22. As hereinafter described, the peripheral edges of the insert apparatus 23 are disposed upon interior flanges extending into the window opening and when the window 22 is closed, it clamps the insulation insert apparatus 23 into position between the glass window and the ledge.

FIG. 3 shows the insulation pad or window cover 23 as having a generally rectangular shape including a pair of longitudinal edges 24 and a pair of side edges 25 wherein the side edges 25 are substantially parallel, the longitudinal edges 24 are substantially parallel, and the side edges 25 are substantially perpendicular to the longitudinal edges 24, as known in the art. The insulation insert apparatus 23 further includes a cover 65 including a bottom or interior side cover fabric or material 26, a top fabric cover surface 32, stitches 27 for securing the top cover surface 32 to the bottom cover surface 26 proximate to, through, or via the peripheral edges of the sheet of relatively stiff support material, as hereinafter described. The stitches 27 and the upper cover fabric 32 and lower cover fabric 26 form a lip portion, bead, or ledge-engaging portion 28 adjacent to periphery of the insert apparatus 23.

FIG. 4 shows a portion of a motor vehicle roof 29, a window frame 30 and a positioning ledge or interior window flange 31 upon which the peripheral edge 28 of the insert apparatus rests for clamping when the glass window 22 is closed and locked thereon. Reference numeral 33 designates, in general, the actual window opening to the interior or cabin portion of the motor vehicle 20.

FIG. 5 shows the insulating insert apparatus 23 having a bottom or interior cover portion 26 which extends into the motor vehicle and, in the preferred embodiment of the present invention, includes fabric which matches the interior of the motor vehicle in color, texture and material for esthetic purposes. The insert apparatus 23 also includes a top cover surface 32, and the top cover surface 32 and bottom cover surface 26 are secured together by fastening means, not shown but not in the art, to form a peripheral lip or ledge-engaging portion 28 of the insert apparatus 23. The automobile body includes a metal portion of the roof 38 and roof insulation 39 which are pressed together in the window opening to form the window ledge or flange 31 upon which the lip portion 28 of the insulation insert apparatus 23 is operatively disposed. The top window glass 22 of the motor vehicle includes a top surface 34, a lower surface 35, and end portions 37 adapted to the operatively disposed directly upon the lip portions 28 above the flanges 31. The interior surface or inside surface 35 of the window glass 22 is disposed proximate the exterior top surface cover 32 while the lower surface of insert apparatus 23 is provided with the interior-matching material cover 26, as previously described. Furthermore, once the window 22 has been closed upon the insulated insert apparatus 23, a clamping mechanism which may be, for example, any type of hold down mechanism, hinge, clamp or the like, known in the art, and particularly those presently used to lock the window 22 in place, will positionally retain the insert pillow apparatus 23 beneath the window 22 until the window is repositioned or the like to remove the insert apparatus 23.

FIG. 5 can be used to broadly illustrate the concept of the present invention. When the sunlight or rays of the sun impinge on the outer surface 34 of the tinted safety glass windows 22, most of the sunlight and substantially all of the heat passes through the window 22 to the insulated insert apparatus 23. As the heat and light leave the lower surface 35 of window 22 and impinge upon the upper or outwardly facing cover 32 of the insert 23, some of the light and heat may be reflected and absorbed, respectively, depending upon the type of material used, and by the support member immediately thereunder which will stop substantially all of the light and at least some of the heat. The remaining heat perhaps the majority of it, is absorbed by the insulation material 42 so that virtually none escapes through the bottom interior matching fabric 26 to render the interior of the vehicle uncomfortable or the like.

FIG. 6 is an exploded detailed view of that portion of FIG. 5 shown within the circle labelled reference 6. A portion of the car top metal 38 is shown with the conventional roof insulation 39. The top and bottom portions 38 of the roof material are extended down into the window opening and pressed together extend into the window opening to form a flange or window-receiving ledge 31 about the periphery thereof so that the glass window 22 can rest on the ledge 31 and be operatively clamped therein during normal window closed operations. The relatively thin pillow-like insertion assembly 23 is shown as including an upper cloth layer 32 and a lower cloth layer portion 26. Sandwiched inbetween the cloth portions 32 and 26 are a relatively rigid support sheet 41 whose upper surface 80 is operatively disposed against the material of the upper cover 32 and its lower surface 81 is operatively disposed upon the upper silver foil or aluminum foil layer 43 surrounding the insulation material 42 which, in the preferred embodiment, may be fiberglass. The fiberglass is contained at the bottom by a second sheet of aluminum foil 44 or the like which rests on the inwardly extending lower cloth surface 26 which matches, at least the exterior, the color texture, and fiber fabric of the vehicle interior for esthetic purposes. Any sunlight impinging on the surface 34 of the window 22 will be substantially passed by the outer cloth material 32 and the sunlight will be stopped by the relatively stiff opaque support member 41. Any sunlight which could pass, would be reflected by the outer layer of silver foil 33. The heat passing through the support material 41 is partially reflected by the foil layer 23 and the remaining heat is absorbed by the fiberglass or similar insulation material 42 contained between the foil or reflecting sheets 43, 44. If any heat does try to escape, the foil 44 can direct it back into the insulation material 42, as shown in the art. It will be noted that the lip 28 which is adapted to rest upon the ledge 31 to be clampably secured therein by the glass 22 and the clamping member 66 may be formed by wrapping the upper layer of the cover material 32 and the lower layer of cover material 26 around the end of the substantially rigid support sheet with the insulation being disposed slightly inward thereof thereby forming the lip 28 upon which the window edge 37 rests and is clamped thereon by window clamping member 56.

FIG. 6 shows an alternate embodiment of the present invention wherein the insert apparatus 23 includes a top cover of cloth-like material or the like 32, a bottom layer of cloth-like material or the like 26 and a sandwich of layers comprising foil 43 adjacent to the bottom of the top cover 32, insulation material 42 proximate the bottom of the foil layer 43, a generally rectangular sheet of substantially resilient material such as plastic, fiberglass, other thin materials capable of bending or the like 60. The resilient material 60 can be flexed or bent to be fitted into the window opening or window slots and wedged therein till one end is fitted in and then released to snap back into the remainder of the slot for removeably positioning the same.

FIG. 8 shows another embodiment wherein no sheet of substantially rigid material 41 is used but instead, a relatively stiff or rigid sheet of polyurethane foam material or any rigid or semi-rigid insulation means 46 has a foil layer 43 positioned thereover and an upper layer 32 and lower layer 26 of cover material for completing the insert apparatus 23. The sheet of aluminum foil 43 can be positioned adjacent the lower cloth layer 26 rather than the upper cloth layer 32; can be operatively disposed on both sides of the sheet of polyurethane material, or can be eliminated entirely, depending upon a particular heat insulation characteristics of the area and the degree of insulation desired by the operator. Furthermore, the relative thickness of the pillow-like insert member 23 may be varied from relatively thin by eliminating substantially all of the insulation 42 to very thick by increasing the amount of insulation 42 or even by varying the thickness of the sheet of relatively stiff material 41, as might be done in different areas of the country.

FIGS. 9, 10 and 11 show the insulation of the insert apparatus 23 of the present invention. In FIG. 9, the window 22 is unlatched by latch 66 and tilted upward or opened to slide back in window slot 64 a short distance. This exposes substantially all of the ledge or flange portion 31 and, as shown in FIG. 10, enables the window cover or insert apparatus 23 to be slid into the window opening 30 and positioned so that the peripheral lip portion 35 is operatively disposed upon the flange 31 to prevent the insert apparatus 23 from falling through the window opening into the interior of the vehicle when flexible sheets are used and from blowing away out the top while the window 22 is left open. FIG. 10 shows the window 22 closed over the insert apparatus 23 and the latch 66 closed or locked to clampably secure the insert apparatus 23 between the inner window flange 31 and the edge 37 of the closed window 22. This disposes the upper surface 32 of the cover proximate to the lower side 35 of the window 22 while the bottom portion of the cover 26 which, as previously described, substantially matches the interior of the vehicle is disposed through the window aperture to protrude slightly into the interior of the vehicle extending to slightly below the level of the interior roof without any loss of esthetic appeal.

FIG. 12 shows the use of an insulated insert apparatus with other types of roof windows. For example, van 49 has its roof 67 provided with a window opening and a tiltable window 50, such as a sun roof, a moon roof or the like is positioned therein so that it can be tiltably raised and lowered. When raised, the window can be locked open to allow air into the interior of the van 49 via the window locking brace 51 and closed upon the window flange or ledge portion 28 and lockably clamped thereon by latch 48 for keeping the window closed, as desired. Generally, sun roofs and moon roofs and the like are substantially more rectangular than the twin T-top windows 22 of FIGS. 1 and 2 and extends substantially across the vehicle. While the T-top windows 22 are positioned substantially directly above the front driver's seat and the front passenger's seat, the moon roof or sun roof may be positioned over the front seat, or slightly rearward thereof. Furthermore, the sunroof and moonroof are generally longer and narrower but the size and shape of the roof top window 50 does not matter since the insertion apparatus of the present invention can be used with any size or shape or construction of roof top window, eventhough minor alterations may be needed where no window ledge 31 is present.

FIG. 13 illustrates a pillow-case type cover comprising the upper or outer layer 32 and the inwardly facing bottom layer 26. In FIG. 13, a zipper device 52 is operatively disposed about at least one side of the insert apparatus 23 and is disposed inwardly of the peripheral edge portion of the cover 68. The zipper 53 can be opened to remove the insulation material 42 and the stiffener 41 so that the cover 32, 26 can be washed or the like. Furthermore, the zipper 52 may be opened to allow the insulation to be increased by adding sheets of insulation material or even bulk insulation for that matter and for decreasing the insulation by removing sheets of insulation material or bulk insulation. Furthermore, the zipper apparatus 52 could be disposed on the lower interior surface 26 but is preferably disposed on the window-facing surface so as to be invisible to passengers in the vehicle 49.

FIG. 14 shows another embodiment of the selectively removeable cover of the present invention. In FIG. 14, the upper cover sheet of fabric or the like 32 has a strip or upper pad of interior-facing VELCRO material, either hooks or loops and the lower or interior cover layer 26 has a similarly disposed strip or pad of window-facing VELCRO material, for example the other of loops or hooks so that when the two layers 26, 32 are pressed together, the quick/detach fastener strips 53 and 54 may be pressed together for fastenably securing the cover 26, 32 shut for containing the insulation 42 and rigid sheet 46 therein. Since the VELCRO strips of hooks and loops or male and female pads are contained within the insert apparatus 23, nothing shows on the interior of the vehicle 67 to spoil the appearances thereof.

In some cases, a vehicle 49 with a top window 50 will not have a ledge or flange 31 sufficient to hold both the window 50 and the insert device 23 of the present invention. Further, sometimes the clamping means or latch 48, 56 will not close when the insert pad 23 is inserted into the window opening. In other cases, the operator may not want to release the window latch, climb out of the vehicle, raise, remove or otherwise reposition the window 50, install the insulation pad 23, and then close and latch the window 22 to complete the operation.

Alternatively, therefore, FIG. 15 shows an embodiment wherein the interior surface of the van roof 67 is provided with a plurality of one male or female snap members 56, 57 positioned at a predetermined locations about the periphery of the window opening 33 and the insulated insert pads 23 of the present invention are provided with the other of corresponding male or female snap members 57, 56 such that the pad 23 can be detachably secured to the interior roof of the van 49 by inserting male snap members 56 into the female snap sockets 57, as conventionally known, until the pad 23 is snap-fastened completely around its periphery so that substantially no sunlight can enter the window 50 and any heat which enters is absorbed by the insulation material 42 within the pad 23, as previously described. Furthermore, any suitable removeable fastening device such as 90° twist fasteners, zippers, hook and eye, buttons, laces and the like can be used so long as they do not detract substantially from the interior appearance of the vehicle. However, the snap members 56, 57 and most other simple fasteners would not be visible to those inside the van 49 since the pad 23 would cover the snaps 56, 57 and present only the attractive lower surface 26 which substantially matches the vehicle interior to those inside said vehicle 49.

FIG. 16, is another embodiment of the concept of FIG. 15 wherein the insulated insert apparatus 23 is shown disposed beneath the window 22 or 50 which is resting on the flange 31. Immediately beneath the window opening 30 pads or strips of interior-facing VELCRO fasteners 58 are secured to the inside roof around the opening or to the area about the ledge within the opening with the hooks or loops facing the vehicle interior. A second pad or strip of VELCRO material 59 is operatively secured to the window-facing cover portion 32 such that the corresponding loops or hooks are facing the roof and when the two VELCRO layers 58, 59 are pressed together, the hook portions and loop portions attach so as to detachably secure the window insert over the lower end of the window opening or disposed therein. The opposite strips 58, 59 can be torn apart to detach the window covering 23 for later use. As use herein, VELCRO will also be referred to as tear strips, hook and loop fastening means and quick attach-detach means. The tear strips 58 secured to the roof would preferably be substantially hidden or blended on to the interior roof fabric.

As previously mentioned, the sheet of relatively stiff or rigid material for the stiffener 41 may be made of any suitable material such as plywood, plastic, metal, cardboard, pressed paper, various types of wood, and the like, as substantially known in the art, given the use to which applicant is putting said stiffener. Furthermore, in alternate applications where a relatively resilient or flexible sheet of material is required, any suitable type of material such as plastic, plywood, metal, and other materials known in the art can be used which will supply sufficient support for the insulated insert apparatus 23 for the present invention while allowing it to flex or easily fit into the window opening and into the window slot or onto the ledge or flange 31. The insulation, may be any conventional type of insulation such as fiberglass, fiberglass sheets with aluminum foil or its equivalent on one or both sides of thereof, bulk insulation material of any kind, various plastic foams, foam rubber, and any conventional insulation material which can absorb heat and prevent the escape of cool air from the interior of the vehicle. While various fasteners have been mentioned, it will be obvious that in addition to stitches, snaps, VELCRO strips, and zippers, that any other types of conventional fastening means could be used as well as including snap fasteners, rivets, staples, epoxy or other glue-like material, heat seals, and the like, as conventionally known.

Furthermore, the nature of the latching means or clamping means used to close the window is conventional depending on the make and model of motor vehicle to be fitted, and applicant's description thereof is merely illustrative of fastening devices admittedly existing in the prior art for other uses. And lastly, applicant's use of a substantially rigid insulation material 42 such as polyurethine foam or the like is meant to include any type of substantially rigid foam, plastic insulation, foam rubber, or the like which provides the necessary insulation while also providing enough support to allow elimination of the sheet 41 support material.

This detailed description of the specific apparatus used to illustrate the preferred embodiment of the present invention and the operation thereof, it will be obvious to those skilled in the art that various modifications can be made without departing from the spirit and scope of the present invention which is limited only by the appended claims.

I claim:

1. An insulated window insert apparatus for use in motor vehicles having at least one window in the top thereof, said at least one window including a window pane and a window pane holder, comprising:
   a generally rectangular sheet of support material for blocking out light from the sun;
   insulation means operably disposed proximate said sheet of support material for absorbing heat from the sun while simultaneously preventing heat from the air conditioned cool air inside the vehicle from escaping through said top window pane; and
   means for covering said generally rectangular sheet of support material and said insulation means, said covering means including a bottom portion having fabric means which substantially matches that of the motor vehicle interior for esthetic purposes and the like.

2. The window insert of claim 1 wherein said sheet of support material includes relatively rigid material.

3. The window insert of claim 1 wherein said sheet of support material includes a relatively resilient material capable of flexing for inserting into said window pane holder prior to closing said window pane thereon for clamping purposes.

4. The window insert of claim 1 wherein said sheet of support material includes a mirror-like reflecting top surface for reflecting substantially all sunlight and heat impinging upon said top window pane.

5. The window insert of claim 1 wherein said insulation means includes fiberglass having outer layers of reflective foil means for reflecting impinging light and heat back through said top window pane and absorbing any heat which passes through said outer reflecting foil layers into said fiberglass.

6. The window insert of claim 1 wherein said insulation means includes at least one sheet of insulating material.

7. The window insert of claim 1 wherein said insulation means includes relatively loose fiber fill-type insulation material.

8. The window insert of claim 1 wherein said insulation means includes a plurality of removeably stacked sheets of insulating material.

9. The window insert apparatus of claim 1 wherein said insulation means is operatively disposed beneath said sheet of support material.

10. The window insert apparatus of claim 9 wherein said top window pane of said motor vehicle is adapted to be removed, tilted open, repositioned and the like for exposing a flange-like window support portion of said window pane holder, said cover means operatively covering the sandwiched layers of said sheet of support material and said insulation means for fastening the peripheral edges of said support sheet such that the covered perimeter of said sheet is adapted to be operatively disposed on said window ledge flange within said window pane holder and clampably secured thereto when said top window pane is shut and locked.

11. The window insert apparatus of claim 10 wherein said cover means includes a lip of material about the periphery of said sheet of support material for cushioning the glass of the top window pane from the edge of the support material when said insert is clampably retained between a closed window pane and said window ledge.

12. The window insert apparatus of claim 1 wherein said sheet of rigid support material and said insulation means comprise at least one sheet of relatively rigid polyurethane foam means.

13. The window insert apparatus of claim 1 wherein said sheet of support material and said insulation means includes at least one sheet of relatively rigid insulating foam means.

14. The window insert apparatus of claim 1 wherein said insulation means is operably disposed over said sheet of support material between said sheet and said window pane.

15. The window insert apparatus of claim 1 wherein said cover means includes a top portion and a bottom portion and means for fastening same about the periphery thereof to enclose said sheet of support material and said insulation means in a relatively thin pillow-type manner, said bottom covering including fabric means for substantially matching an interior of said motor vehicle and said top material means generally matching a color of the area about said window pane holder, a color of tinted glass, a color of tinted glass, a color of said motor vehicle, and the like.

16. The window insert apparatus of claim 15 wherein said cover means further includes fastening means for selectively opening said cover for removing said for cleaning purposes and the like and for selectively adding and removing said insulation material to increase and decrease the amount of insulation in said insert apparatus to control an amount of heat getting into said motor vehicle and an effectiveness of an air conditioning system and the like.

17. The window insert apparatus of claim 16 wherein said cover fastening means includes a zipper means extending proximate at least one edge portion of said cover means for selectively opening and closing same.

18. The window insert apparatus of claim 16 wherein the periphery of the top portion of said cover means includes one of a strip of quick attach/detach loop material and a strip of corresponding quick attach/detach hook material and the periphery of the bottom portion of said cover including the other of said strips such that said cover can be closed by merely pressing said strips together and opened by tearing said strips apart for inserting and removing insulation and for cleaning a cover means, as desired.

19. An insulated window cover for covering glass-like windows disposed in the top of motor vehicles, said glass-like top windows being adapted to be removeably secured on a flange-like window ledge disposed about the outer edge of the window opening and extending inwardly therefrom during normal operation but said glass-like top window being at least one of removeable, repositionable, liftable, tiltable and the like for letting fresh air into the interior of the motor vehicle, said insulated window cover comprising:
  top covering means for receiving the impinging rays of the sun coming through said glass-like top windows;
  bottom covering means adapted to have its exterior surface disposed extending into the interior of the motor vehicle directly beneath said glass-like top window and substantially parallel thereto;
  a sheet of relatively rigid material sized to be operatively disposed within said window opening and operatively supported on said window ledge for supporting said cover and to prevent its falling out of the window opening and for maintaining the shape thereof, said sheet of relatively rigid material being operatively disposed proximate said top covering means and directly beneath said top covering means;
  insulation means operatively disposed between said sheet of relatively rigid material and said bottom covering means for reflecting and absorbing incoming heat to prevent heat and light from entering the interior of the vehicle from the top window and for preventing the air from the air conditioned interior of the vehicle from being heated to reduce the efficiency thereof therefore saving on fuel while increasing vehicle comfort, said bottom covering means being operatively disposed over said insulation means and around the ledge-engaging edges of said sheet of relatively rigid material while the top covering means is operatively disposed over the protruding edges of the sheet of relatively rigid material to form an overlapping area about the peripheral of said sheet of relatively rigid material for operatively engaging said window ledge for clamping the cover and edge of said sheet between said top window and said window ledge when the top window is shut and locked in its normally closed position; and
  fastening means for securing said top and bottom cover portions to enclose said insulation and said sheet for fastening said insulated window cover together while forming said window ledge-engaging lip.

20. The insulated window cover of claim 19 wherein said bottom cover means includes an interior-facing surface including a material for matching the color, texture and the fabric of the vehicle interior for esthetic purposes.

21. The insulated window cover of claim 19 wherein said insulation means may be selectively thick or relatively thin depending upon the area of use and the degree of heat acceptable to the owner of the vehicle.

22. An insulated shade cover for each of the top windows of a T-top automobile wherein each of the T-top windows can be unlocked and repositioned or removed exposing an inner window-supporting ledge and wherein each of said T-top windows can be unlocked and repositioned as desired, said insulated shade cover comprising:
  a sheet of substantially rigid material sized for being inserted into the window opening with its peripherial edges being operably disposed on said window ledge portion;
  insulation means operably disposed proximate said sheet of substantially rigid material for keeping heat out of the interior of the car to increase air conditioner efficiency and comfort while saving on gasoline consumption and while simultaneously reflecting a significant portion of sunlight impinging upon the window while absorbing substantially all remaining heat to keep the interior of the car cool; and
  means for covering said sheet of substantially rigid material and said insulation material disposed proximate the bottom of said sheet to form a relatively thin pillow-type window cover adapted to have its peripherial edges operably positioned on said window ledge and clamped therein by closing and locking said T-top window.

23. The insulated shade cover of claim 22 wherein said covering means includes means for normally fastening the top and bottom portions of the covering means together for selectively encasing sheet of substantially rigid material and said insulation, said bottom covering including an interior-facing surface extending into the interior of the vehicle and including a material which matches the vehicle interior in fabric, texture and color, said covering means further including means for selectively fastening and unfastening said cover means for removing the cover for cleaning purposes or the like and for inserting or removing insulation to change the degree of insulation, as desired by the vehicle operator.

24. An insulated window covering apparatus for use in a motor vehicle having at least one window in the roof thereof, said at least one window including a window pane and a holder for said window pane comrising:
  a relatively thin insulated pillow-like means adapted to be removeably positioned beneath said at least one roof window pane for blocking substantially all sunlight from entering the motor vehicle interior through said at least one window, said pillow-like means including insulation means for absorbing substantially all heat entering through said at least one window pane to prevent heat from rendering motor vehicle interior uncomfortably warm or hot, to prevent air conditioned air from being heated to reduce efficiency of the air conditioning system and saving fuel required for additional air conditioning, said pillow-like means including covering means for operably containing said insulation means and including a lower, interiorfacing fabric means for substantially matching the color, texture, and material of the motor vehicle interior; and two piece selectively operable fastening means, one piece of said fasternting means being operably disposed about the periphery of the window pane holder on the interior roof of the motor vehicle and the other of said two piece fastening means being operably secured proximate the periphery of a top window-facing surface of said covering means for quickly and easily attaching said insulated window covering over said window pane by joining corresponding pieces of said fastening means without opening said at least one window pane, leaving the motor vehicle, and decreaseing the beauty of the motor vehicle interior.

25. The insulated window covering apparatus of claim 24 wherein said to piece fastening means includes a two piece tear fastener having one pad of hooks portion and one pad of loops portion, said one piece of said fastening means including one of said pad of hooks and said pad of loops and said other piece of said fastening means including the other of said pad of hooks and said pad of loop such that said window covering apparatus can be operably secured over said window pane opening by simply positioning it directly beneath said opening and pressing up on the periphery of said window covering apparatus to join said hooks and said loops to retainably secure said apparatus in operative position and for removing same by tearing the hooks and loops apart to remove said apparatus.

26. The insulated window covering apparatus of claim 24 wherein said two piece fastening means includes snaps having male and female portions, said one piece including one of said male and female portions and said other piece including the other of said male and female portions, said covering apparatus being operatively installed and removed from beneath said window pane by snapping and unsnapping said snaps, respectively.

27. The insulated window covering apparatus of claim 24 further including a generally rectangular sheet of relatively rigid material operably disposed in said pillow-like means proximate said insulation means for stiffening said pillow-like means to prevent sagging and the like and for blocking out substantially all sunlight entering said at least one window pane.

28. The insulated window covering apparatus of claim 24 wherein said pillow-like means further includes a generally rectangular sheet of relatively resilient material operably disposed within said pillow-like means proximate said insulation means for supporting same while blocking out sunlight.

29. The insulated window covering apparatus of claim 24 wherein said insulation means includes a relatively rigid block of plastic-like foam means for supporting said apparatus while absorbing incoming heat.

30. The insulated window covering apparatus of claim 24 wherein said covering means includes a slot-like aperture means therein and means for releaseably fastening said slot-like aperture means open and shut for removing said insulation means for cleaning said covering means and for adding and removing quantities of said insulation means as desired.

* * * * *